United States Patent [19]

Miller

[11] Patent Number: 5,255,039

[45] Date of Patent: Oct. 19, 1993

[54] FILM ASSEMBLAGE

[75] Inventor: Stephen H. Miller, Rochester, N.Y.

[73] Assignee: Eastman Kodak Company, Rochester, N.Y.

[21] Appl. No.: 898,667

[22] Filed: Jun. 15, 1992

[51] Int. Cl.$^5$ .......................................... G03B 17/26
[52] U.S. Cl. .................................. 354/275; 242/71.1
[58] Field of Search ............... 354/275; 242/71.1, 197, 242/198

[56] References Cited

U.S. PATENT DOCUMENTS

| | | | |
|---|---|---|---|
| 2,630,050 | 3/1953 | Fairbank | 95/31 |
| 3,722,385 | 3/1973 | Kamp et al. | 95/22 |
| 4,074,870 | 2/1978 | Kaufman | 242/71.1 |
| 4,113,192 | 9/1978 | Osanai | 242/71.1 |
| 4,138,068 | 2/1979 | Kinoshita | 242/71.1 |
| 4,148,395 | 4/1979 | Syracuse et al. | 206/414 |
| 4,212,527 | 7/1980 | Fischer | 354/275 |
| 4,291,966 | 9/1981 | Bendoni et al. | 354/275 |
| 4,335,948 | 6/1982 | Cocca | 354/275 |
| 4,445,768 | 5/1984 | Gold | 354/275 |

Primary Examiner—Monroe H. Hayes
Attorney, Agent, or Firm—Roger A. Fields

[57] ABSTRACT

A film assemblage comprises a cassette shell having a film ingress/egress slot through which a leading section of a filmstrip coiled in a roll inside the shell may be moved outside the shell, and a pull-strip for engaging the leading section which can be manually pulled outwardly through the slot to similarly draw the leading section outside the shell. According to the invention, respective cooperating means are affixed to the shell and the pull-strip for constraining the pull-strip to be manually pulled around the exterior of the shell to draw the leading section of the filmstrip outwardly through the slot.

8 Claims, 6 Drawing Sheets

FILM ASSEMBLAGE

BACKGROUND OF THE INVENTION

1. Field of the Invention

The invention relates generally to the field of photography, and in particular to a film assemblage having means for drawing a leading section of a filmstrip out of a lighttight cassette.

2. Description of the Prior Art

Prior art U.S. Pat. No. 4,335,948, issued Jun. 22, 1982, discloses a film assemblage comprising a cassette shell having a film ingress/egress slot through which a leading section of a filmstrip coiled in a roll inside the shell may be moved outside the shell, and a pull-strip for engaging the leading section which can be manually pulled outwardly through the slot to similarly draw the leading section outside the shell. The pull-strip has an intermediate section which normally is wrapped around the outermost convolution of the film roll in frictional contact with the outermost convolution and an interior curved wall of the shell, and it has a pair of opposite end sections normally extending outwardly from the slot which are wrapped in opposite directions about the exterior of the shell. A pull-tab releasably secures the two end sections together end-to-end. When the connection between the two opposite end sections is severed, the end sections fall out of covering relation with the exterior of the shell. If the end section with the pull-tab is then manually pulled from the slot, it will drag the leading section of the filmstrip through the slot. This operation, especially because the two end sections will hang loose from the exterior of the shell, requires some manual dexterity and may be difficult for certain people.

SUMMARY OF THE INVENTION

A film assemblage comprises a cassette shell having a film ingress/egress slot through which a leading section of a filmstrip coiled in a roll inside the shell may be moved outside the shell, and a pull-strip for engaging the leading section which can be manually pulled outwardly through the slot to similarly draw the leading section outside the shell. According to the invention, respective cooperating means are affixed to the shell and the pull-strip for constraining the pull-strip to be manually pulled around the exterior of the shell to draw the leading section of the filmstrip outwardly through the slot. This device requires much less dexterity to operate as compared to the one disclosed in prior art U.S Pat. No. 4,335,948.

DETAILED DESCRIPTION OF THE PREFERRED EMBODIMENT

Figure 1:
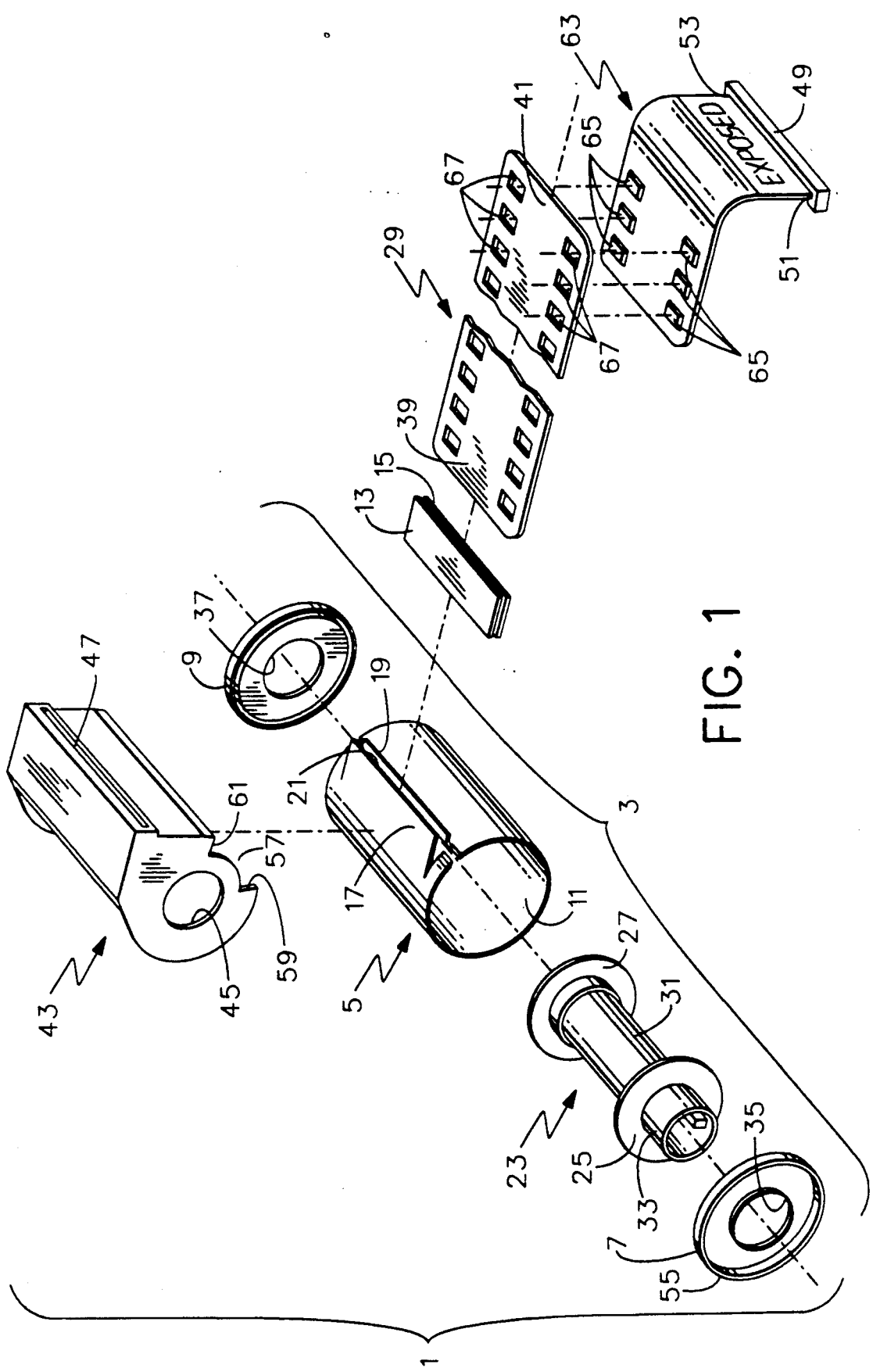
FIG. 1 is an exploded perspective view of a film assemblage according to a preferred embodiment of the invention.
Figure 2:
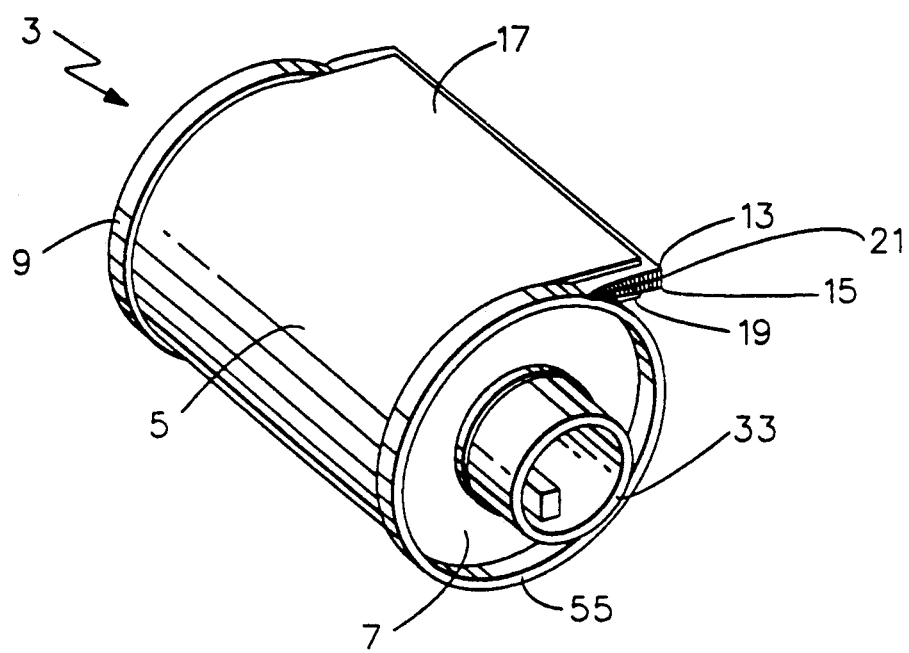
FIG. 2 is a perspective view of a conventional 35 mm film cassette which is a component of the film assemblage.

FIG. 1 shows a film assemblage 1 including a conventional 35 mm film cassette 3. As is known, the cassette 3 comprises a shell or housing consisting of a metal can 5 and a pair of metal end caps 7 and 9 which cover opposite open ends 11 (only one shown) of the can. A pair of black plush pads 13 and 15 are adhered to respective inner faces of two parallel lips 17 and 19 of the can 5. The pads 13 and 15 define a lighttight film ingress/egress slot 21 between each other. See FIGS. 2 and 5. A film spool 23 consists of a pair of flanges 25 and 27 between which a 35 mm filmstrip 29 is coiled in a roll about a spool core 31. The spool core 31 has a pair of shanks 33 (only one shown) which extend through respective openings 35 and 37 in the end caps 7 and 9 to rotatably support the film spool 23 inside the can 5. An inner or trailing end section 39 of the filmstrip 29 is secured to the spool core 29 and an outer or leading end section 41 of the filmstrip is normally located along the slot 21 between the pads 13 and 15. See FIG. 5.

Figure 3:
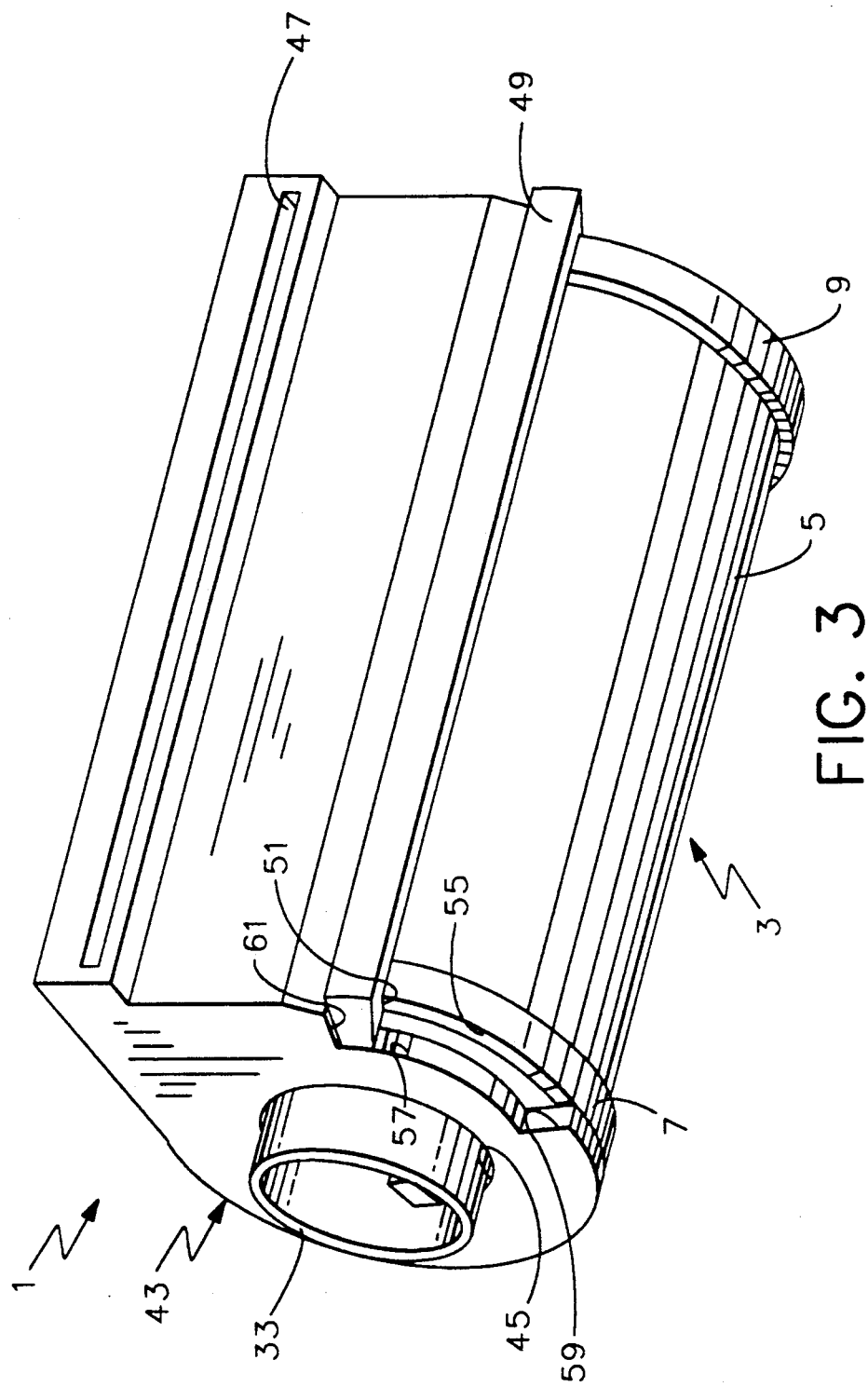
FIG. 3 is a perspective view of the film assemblage in an initial state.
Figure 4:
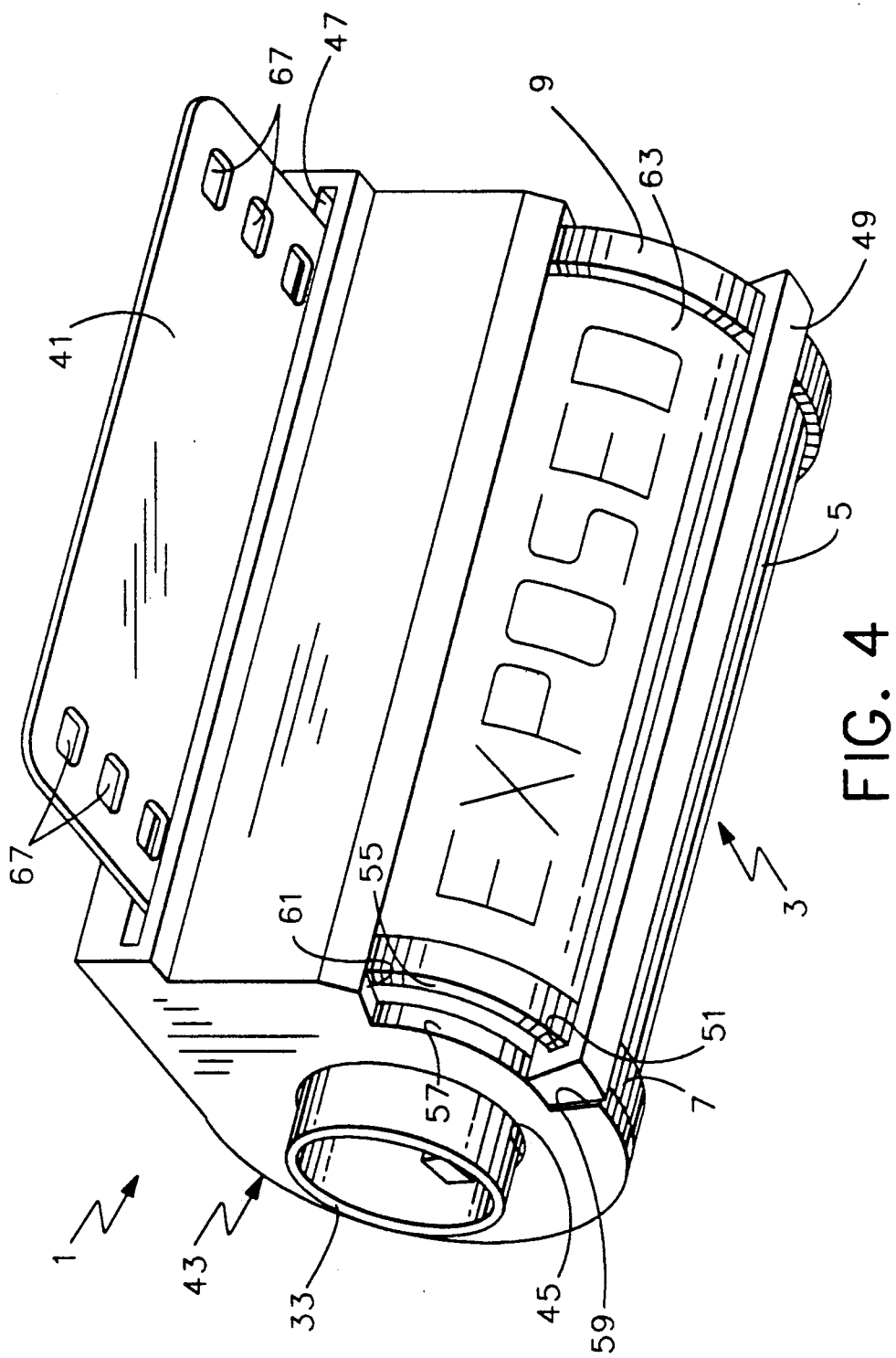
FIG. 4 is a perspective view of the film assemblage in a used state.
Figure 5:
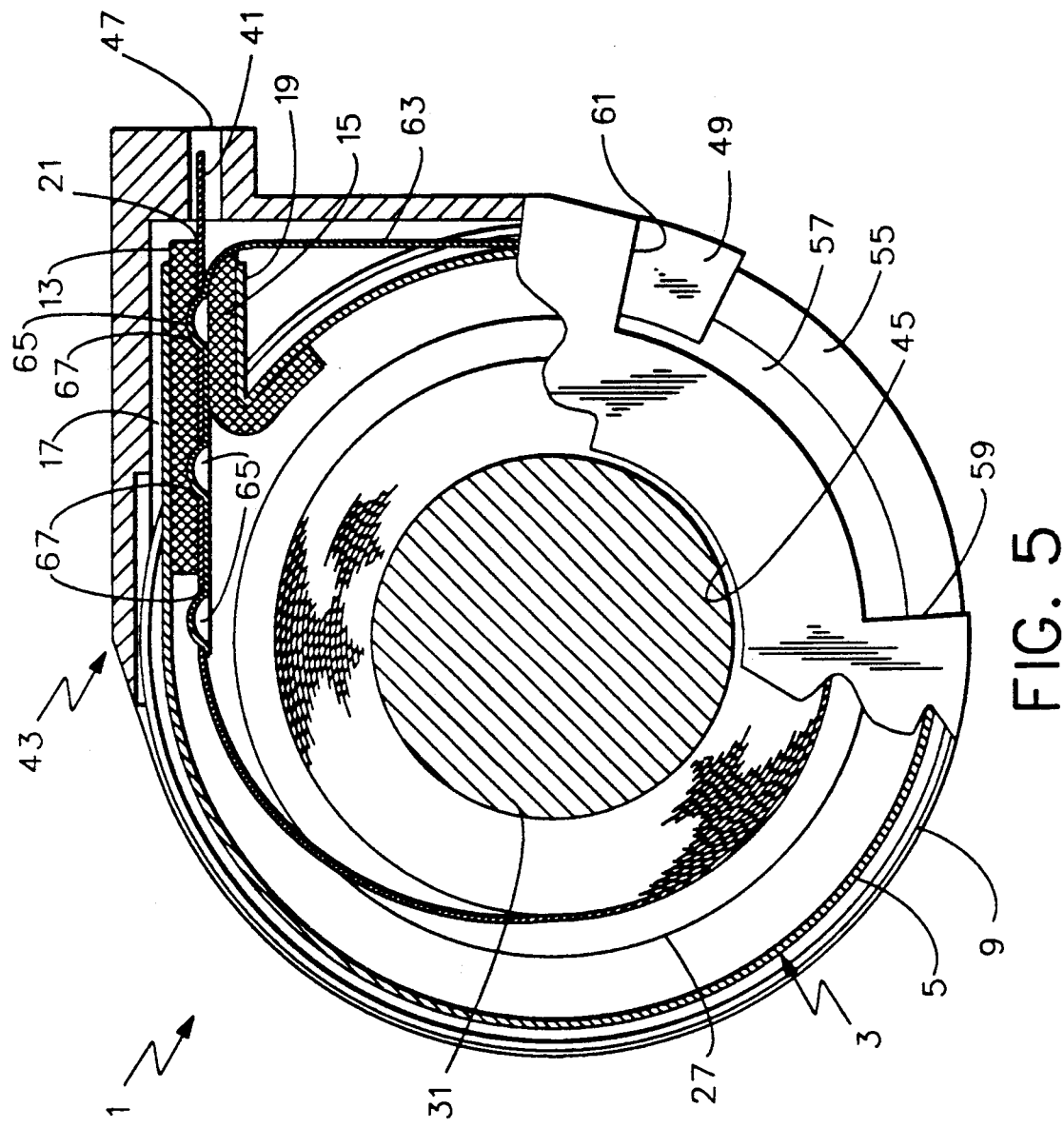
FIGS. 5 and 6 are sectional views of the film assemblage that correspond to FIGS. 3 and 4.

According to the invention, a cover 43 is superimposed over the can 5 as shown in FIGS. 3 and 5. The cover 43 has respective end openings 45 (only one shown) through which the two shanks 33 of the spool core 31 extend, and it has a film passage opening 47 aligned with the slot 21 in the can 5. See FIG. 1. A pull-bar 49 has a pair of integral end channels 51 and 53 which engage respective circular rims or tracks 55 (only one shown) formed on the end caps 7 and 9, to support the pull-bar for movement along the rims within a 60 degrees cut-out 57 in the cover 43. See FIGS. 1 and 3-6. A pair of opposite edges 59 and 61 of the cut-out 57 serve as respective stops that limit movement of the pull-bar 49.

A pull-strip 63 has two series of evenly spaced projections 65 which are received in corresponding perforations 67 in the leading end section 41 of the filmstrip 29 to releasably engage the pull-strip with the leading end section. See FIGS. 1, 5 and 6. The pull-strip 63 is connected to the pull-bar 49 and has a film exposure status indication "EXPOSED" that is normally hidden beneath the cover 43. See FIGS. 3 and 4.

Figure 6:
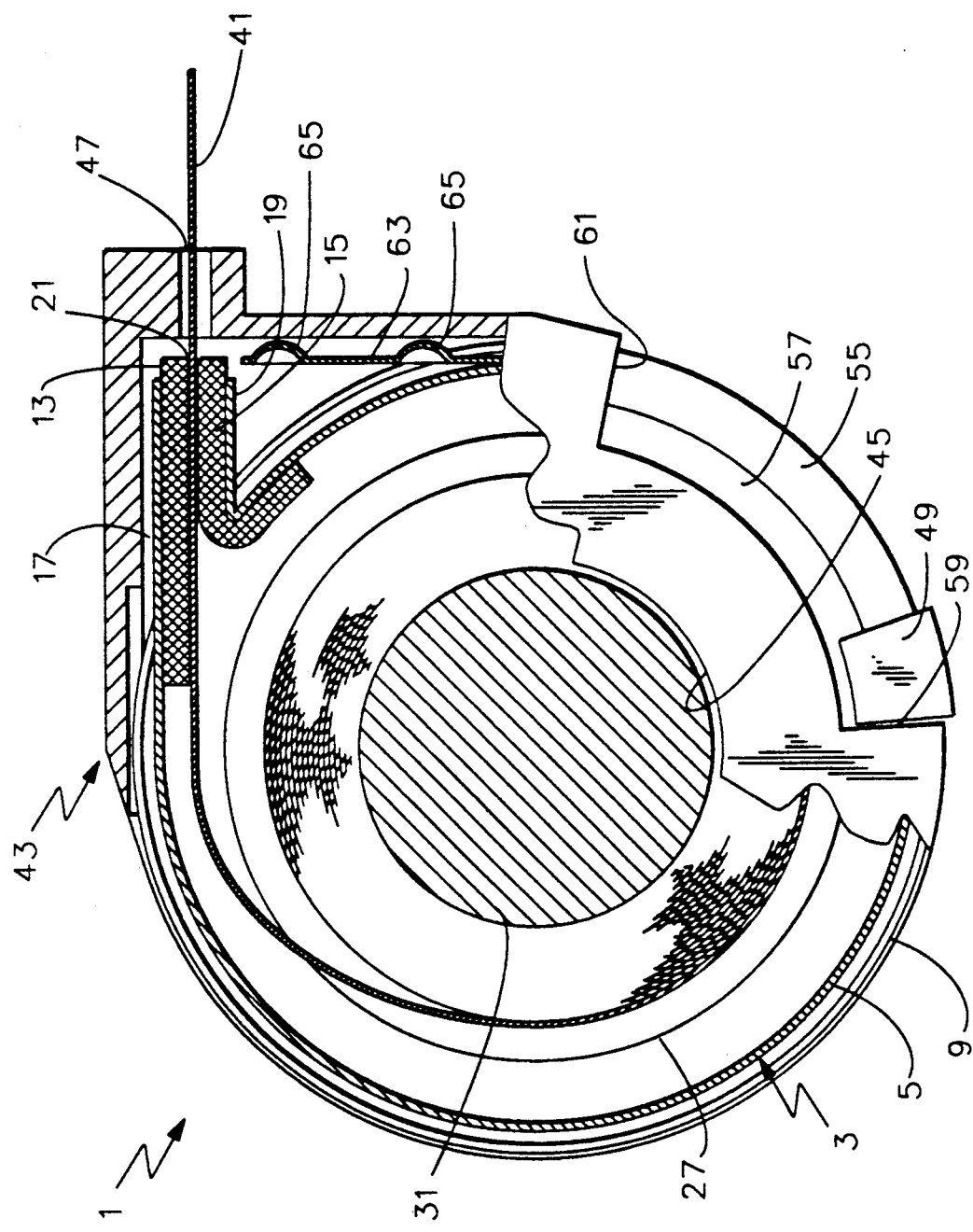

When the pull-bar 49 is moved along the rims 55 of the end caps 7 and 9 from against the edge 61 of the cut-out 57 to against the edge 59 of the cut-out as shown in FIGS. 3, 5 and FIGS. 4, 6, it pulls the pull-strip 63 at 90 degrees from the slot 21 in the can 5 around the exterior of the can. In turn, the pull-strip 63 draws the leading end section 41 of the filmstrip 29 outwardly through the slot 21 and forces the leading end section to be fed outwardly through the opening 47 in the cover 43. Simultaneously, the film exposure status indication "EXPOSED" is moved from beneath the cover 43 into the cut-out 57 to permit it to be seen. As the leading end section 41 is advanced into the opening 47, it separates from the pull-strip 63 as shown in FIG. 6.

The invention has been described with reference to a preferred embodiment. However, it will be appreciated that variations and modifications can be effected within the ordinary scope of the art without departing from the scope of the invention.

I claim:

1. A film assemblage comprising a cassette shell having a film ingress/egress slot through which a leading section of a filmstrip coiled in a roll inside said shell may be moved outside the shell, and a pull-strip for engaging said leading section which can be manually pulled outwardly through said slot to similarly draw the leading section outside said shell, is characterized in that:

respective cooperating means are affixed to said shell and said pull-strip for constraining the pull-strip to be manually pulled around the exterior of the shell to draw said leading section of the filmstrip outwardly through said slot.

2. A film assemblage as recited in claim 1, characterized further in that:

stop means located on the exterior of said shell limits the extent to which said pull-strip can be manually pulled around the exterior of the shell to less than 180 degrees.

3. A film assemblage as recited in claim 1, wherein said cooperating means are positioned relative to said slot to constrain said pull-strip to be manually pulled substantially at 90 degrees from the slot.

4. A film assemblage as recited in claim 1, wherein said cooperating means include respective arcuate tracks formed along opposite ends of said shell and a pull-bar supported for movement along said tracks in engagement with said pull-strip to manually pull the pull-strip around the exterior of said shell.

5. A film assemblage as recited in claim 1, wherein said pull-strip includes a film exposure status indication that is located to be visible only after the pull-strip is manually pulled around the exterior of said shell.

6. A film assemblage as recited in claim 1, wherein said pull-strip includes a series of integral projections adapted to be received in respective perforations in said leading section of the filmstrip to releasably engage the leading section.

7. A film assemblage comprising a cassette shell having a film ingress/egress slot through which a leading section of a filmstrip coiled in a roll inside said shell may be moved outside said shell, and a pull-strip for engaging said leading section which can be manually pulled outwardly through said slot to similarly draw the leading section outside said shell, is characterized in that:

a pull-bar is connected to said pull-strip to manually pull the pull-strip outwardly through said slot;

respective cooperating means are affixed to said shell and said pull-bar to support the pull-bar for movement to manually pull said pull-strip around the exterior of the shell from said slot; and a cover is superimposed over said shell and has a film passage opening aligned with said slot and a cut-out containing said pull-bar to limit movement of the pullbar.

8. A film assemblage as recited in claim 7, wherein said pull-strip includes a film exposure status indication that is normally located beneath said cover to prevent it from being seen but is moved into said cut-out to allow it to be seen when said pull-bar is moved to manually pull the pull-strip around the exterior of the slot.

* * * * *